(12) United States Patent
Cossaboom (10) Patent No.: US 9,186,731 B2
(45) Date of Patent: Nov. 17, 2015

(54) APPARATUS FOR REMOVING PLUGS

(76) Inventor: George Cossaboom, Sabattus, ME (US)

( * ) Notice: Subject to any disclaimer, the term of this patent is extended or adjusted under 35 U.S.C. 154(b) by 1083 days.

(21) Appl. No.: 13/250,644

(22) Filed: Sep. 30, 2011

(65) Prior Publication Data

US 2013/0084140 A1    Apr. 4, 2013

(51) Int. Cl.
  *B23P 19/04* (2006.01)
  *B23B 47/34* (2006.01)
  *B23B 51/04* (2006.01)

(52) U.S. Cl.
  CPC ............. *B23B 47/34* (2013.01); *B23B 51/0453* (2013.01); *Y10T 408/50* (2015.01)

(58) Field of Classification Search
  USPC .......................................................... 29/261
  See application file for complete search history.

(56) References Cited

U.S. PATENT DOCUMENTS

| | | | |
|---|---|---|---|
| 186,229 A * | 1/1877 | Casterline | 29/261 |
| 1,976,623 A * | 10/1934 | Monroe et al. | 81/3.4 |
| 2,145,129 A * | 1/1939 | Puccetti | 81/3.41 |
| 4,398,706 A * | 8/1983 | Kaulfuss | 269/88 |
| 4,755,087 A | 7/1988 | Parent | |
| 4,941,252 A * | 7/1990 | Haisch et al. | 29/261 |
| 4,977,661 A * | 12/1990 | Wood | 29/261 |
| 5,076,741 A | 12/1991 | Littlehorn | |
| 5,251,368 A * | 10/1993 | Somerville et al. | 29/255 |
| 5,261,149 A * | 11/1993 | Sutton | 29/261 |
| 5,651,646 A | 7/1997 | Banke et al. | |
| 5,690,452 A | 11/1997 | Baublits | |
| 5,904,454 A * | 5/1999 | Washer | 408/67 |
| 6,895,646 B1 * | 5/2005 | Houg | 29/252 |
| 6,935,004 B2 * | 8/2005 | Terrill et al. | 29/259 |
| D529,525 S | 10/2006 | Waldron et al. | |
| 7,117,573 B1 * | 10/2006 | Hu | 29/261 |
| 7,160,064 B2 | 1/2007 | Jasso | |
| 7,669,306 B2 * | 3/2010 | Palka | 29/261 |
| 7,967,535 B2 | 6/2011 | Eiserer | |
| 8,052,356 B2 * | 11/2011 | Singh | 408/67 |
| 2005/0229373 A1 * | 10/2005 | Hu et al. | 29/261 |
| 2010/0086372 A1 | 4/2010 | Werner | |

OTHER PUBLICATIONS

Qk-Saw store website showing plug ejector at www.qksaw.com/news.php, 2008, 3 pp.
Hole Saw arbor tools showing plug ejecting hole saw at www.icscuttingtools.com, 2004, 2 pp.

(Continued)

*Primary Examiner* — Lee D Wilson
*Assistant Examiner* — Alvin Grant
(74) *Attorney, Agent, or Firm* — Caseiro Burke LLC; Chris A. Caseiro (57) ABSTRACT

An apparatus to remove plugs. In a first embodiment, the apparatus is configured to remove a plug from a hole saw, and in a second embodiment, the apparatus is configured to remove a plug from a hole. The first apparatus includes a pivotable support frame for retaining and stabilizing a cleaning structure. The cleaning structure is arranged to fit within the cylinder of a hole saw and cause engagement with the plug until the plug is split sufficiently to cause its removal from the hole saw. The second apparatus includes a tube and a retractable plug engagement rod retainable in the tube. The tube and plug engagement rod are secured together when the plug engagement rod is extended from the tube. The end of the plug engagement rod is configured to enable its insertion into a plug. The second apparatus is withdrawn, extracting the plug in the process.

6 Claims, 6 Drawing Sheets

(56) References Cited

OTHER PUBLICATIONS

Quick Release Hole Saw Arbor at www.leevalley.com/en/wood/page.aspx?c=&p=59737&cat=1,180,42316, 1998 et seq., 1 pp.

Mandrel, holesaw qck eject at www.homehardware.ca/en/rec/index.htm/Tools/Power-Tools/Portable-Acc/Holesaws/Bi-metal/MANDREL-HOLESAW-QCK-EJECT-1-1-4-6/_/N-ntm6t/R-I1267260, 2011, 1 pp.

Lenox Hole Saw Ejector Arbor at www.newegg.com/Product/Product.aspx?Item=N82E16803007521, 1 pp.

Mandrex hole saw with ejector at www.mandrex-system.com, 2 pp.

Hole Saw Slug Remover—Hole Saw Slug Extractor at www.mytoolstore.com/relton/holesaw.html, 1 pp.

Lenox plug remover at www.lenoxunplugged.com, 2011, 1 pp.

Ask Jon Eakes—Automatic plug ejectors for hole saws at www.joneakes.com/jons-fixit-database/962-Automatic-plug-ejectors-for-hole-saws, Aug. 3, 2010, 1 pp.

Grainger QEP Carbide Hole Saw, Ejector Spring at www.grainger.com/Grainger/QEP-Tile-Hole-Saw-1TGG9, 1994-2011, 1 pp.

Twister ezeOut Plug-Ejecting Hole-Saw Arbor System at www.888egotit.com/Twister-ezeOUT-Hole-Saw-p/e-twist-01.htm, 1 pp.

Starrett Special Purpose Hole Saws at www.starrett.com/pages/1232_new_hole_saws.cfm, 4 pp.

Quick-Saw, Inc. Hole Saw Slug Ejectors at www.qksaw.com/slug_ejectors, 2010, 2 pp.

* cited by examiner

APPARATUS FOR REMOVING PLUGS

BACKGROUND OF THE INVENTION

1. Field of the Invention

The present invention relates to an apparatus for removing plugs. More particularly, the present invention relates to an apparatus for removing plugs from a hole saw and an apparatus for removing plugs from holes created using a device such as a hole saw. Still more particularly, the present invention is an apparatus configured for insertion into the plug and removal of the plug from its location.

2. Description of the Prior Art

A hole saw is used to create holes in structures. Most commonly, the structures are made of wood and the hole saw is used to form a portal of selectable dimensions. The hole saw is formed as a body having a first end and a second end. The first end includes a shank arranged to fit into a rotation device, such as a drill. Closure of a chuck of the rotation-causing device around the shank causes releasable engagement of the hole saw with the rotation-causing device. The shank may also include a bit extending substantially centered in the hole saw and passing to the second end of the hole saw, functioning to enable the creation of a pilot hole for proper alignment of the position of the hole to be created. The second end of the hole saw includes a cylinder terminating with a series of saw teeth.

In operation, activation of the rotation-causing device having the hole saw attached to it results in rotational movement of the hole saw. When placed in contact with a structure, such as a piece of wood, the pilot bit and the saw teeth dig into the structure. The application of pressure to the rotation-causing device allows the pilot bit and saw teeth to penetrate into the structure. The extent to which the saw teeth can penetrate into the structure is dependent upon the depth of the cylinder of the hole saw.

Whether the hole saw is pushed into the structure to the maximum distance or less than that, the process of creating the hole produces an annulus, the outer diameter of which is the desired diameter of the hole to be formed in the structure and the inner diameter of which is a plug of the structure to be removed to create the hole. The plug that is created must be removed, either from the structure or from within the cylinder of the hole saw. In some instances, the plug that remains in the hole may be pushed or pulled from the structure to remove it and leave the desired hole as the remainder. In other instances, the plug becomes stuck on the pilot bit within the cylinder of the hole saw and so is withdrawn from the formed hole when the hole saw is withdrawn from the structure.

The hole saw also includes in the second end two opposing slots extending beyond the depth of the saw teeth and intended to allow sawdust to exit the saw during the cutting process. For those plugs that are retained in the body of the hole saw, the opposing slots may facilitate their removal. The slots may also be used to insert a screwdriver, nail or the like to wedge into the plug and force it out. The slots are not helpful in removing a plug left in the structure after withdrawal of the hole saw.

In reality, it has been found that plugs are difficult to remove from the interior of the hole saw. The slots do not allow sufficient sawdust to escape and the plug remains tightly bound within the interior of the hole saw. Users try to remove the plug from the hole saw by physically tapping the hole saw against an object or by trying to insert a thin object, such as a screwdriver tip, through one of the cleaning slots, as indicated, so as to push the plug out of the hole saw. Both types of efforts may end up working, but they can result in damage to the hole saw. Often, the process can be very time consuming. Moreover, neither process is helpful in removing a plug that remains stuck in the hole. In those instances when the plug is wedged in the hole, it often occurs when the plug is of substantial length and simply pulling it out, or even pushing or hammering at it from one end is unsuccessful or not possible if the other side of the structure is not readily accessible.

Therefore, what is needed is an apparatus to facilitate the removal of a plug from a hole saw. Such an apparatus must be easy to use and quickly cause the removal of the plug. What is also needed is an apparatus to facilitate the removal of a plug created by a hole saw from a hole. Such an apparatus must be easy to use and quickly cause the removal of the plug. Further, what is needed is a kit that includes both such types of apparatuses to enable a user to be prepared for the removal of a hole saw plug, whether it is located within the interior of the hole saw or it is located within the hole created in the structure. Both apparatuses should reduce the time required to remove a wedged plug without causing damage to the hole saw.

SUMMARY OF THE INVENTION

It is an object of the present invention to provide an apparatus to facilitate the removal of a plug from a hole saw. It is also an object to provide such an apparatus that is easy to use and that quickly causes the removal of the plug. It is another object of the present invention to provide an apparatus to facilitate the removal of a plug created by a hole saw from a hole. It is further an object to provide such an apparatus that is easy to use and that quickly causes the removal of the plug. Further, it is an object of the invention to provide a kit that includes both such types of apparatuses to enable a user to be prepared for the removal of a hole saw plug, whether it is located within the interior of the hole saw or it is located within the hole created in the structure. Both apparatuses are configured to reduce the time required to remove a wedged plug without causing damage to the hole saw.

These and other objects are achieved with the present invention, which is an apparatus in two embodiments, a first embodiment configured to cause the removal of a plug from the interior of a hole saw and a second embodiment configured to cause the removal of a plug from a hole. The first apparatus is a hole saw cleaner having a pivotable base frame and a cleaning structure affixed to the base frame. The base frame is collapsible to enable convenient stowage of the first apparatus when not in use. The base frame includes a first leg and a second leg. In a preferred embodiment, the two legs are configured with one longer than the other so that when they are collapsed together, one nests within the dimensions of the other. In this embodiment, the two legs are parabolic in shape so that, when collapsed, there is an inner leg and an outer leg. The cleaning structure is in axial alignment with the two collapsed legs.

The first apparatus is arranged so that when the two legs are extended, they form a base on opposing sides of the cleaning structure. The cleaning structure is configured to extend upwardly from a surface on which the legs of the base frame rest when extended. A user may clean a plug retained in a hole saw by aligning the pilot bit of the hole saw with a centered port of the cleaning structure. The hole saw is then rotated and pushed onto the cleaning structure so that the body of the cleaning structure contacts the plug. The cleaning structure is configured to cause the plug to engage with the cleaning structure such that the cleaning structure extends into the plug and causes the plug to split. The split plug may then be removed from the hole saw. For example, the cleaning structure may be threaded, like a lag bolt, to form cutting surfaces. The contact between the plug and the cleaning structure is maintained so that the plug threads itself onto the lag screw and the lag screw is sized so that it forces the plug outwardly during the course of that threading until the plug is split.

The second apparatus is a plug extractor having two primary components, an elongate structural body with a cavity and a telescoping extender axially aligned with, and slidably joined to, the structural body within the cavity. The extender includes a plug engagement end arranged to contact and become forcibly engaged with a plug stuck in a hole. The opposing end of the extender includes a base having an outer dimension greater than at least a portion of the interior of the cavity of the structural body. With the second apparatus in a collapsed state so that the extender is substantially within the cavity of the structural body, a user places the plug engagement end in contact with the plug, rotates the second apparatus and causes the plug engagement end to enter the plug. The second apparatus may be rotated for a selectable period of time until the plug is sufficiently joined to the extender. The structural body is then pulled, causing the extender to extend out of the cavity in a relatively rapid fashion to generate a force that results in the plug being withdrawn from the hole as being affixed to the plug engagement end of the extender. This results in a clearing of the hole.

The first apparatus and the second apparatus may be provided in a kit with instructions about their usage. Each may be used separately, the first apparatus used to clear plugs from hole saws and the second structure used to clear plugs from holes, particularly, deep holes with plugs that are firmly stuck and/or stuck over a considerable length. The first apparatus and the second apparatus are easy to use, reduce the amount of time and energy required to clear a plug, and are sized and configured for convenient stowage and transport. They may be used with conventional rotation-causing tools including drills, for example. These and other advantages of the present invention will become more apparent upon review of the following detailed description, the accompanying drawings and the appended claims.

DETAILED DESCRIPTION OF THE PRESENT INVENTION

Figure 1:
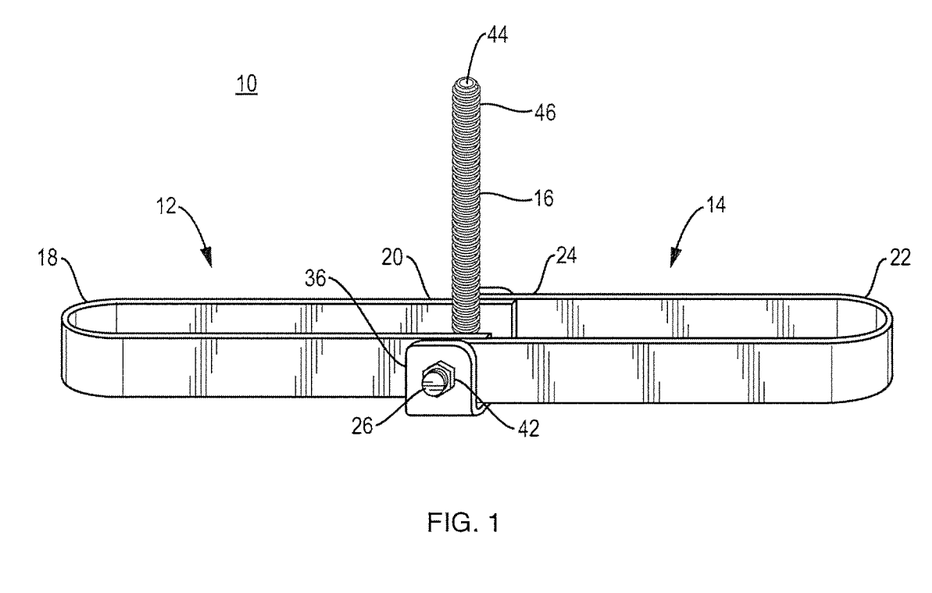
FIG. 1 is a perspective view of the first apparatus of the present invention in an operable position.
Figure 2:
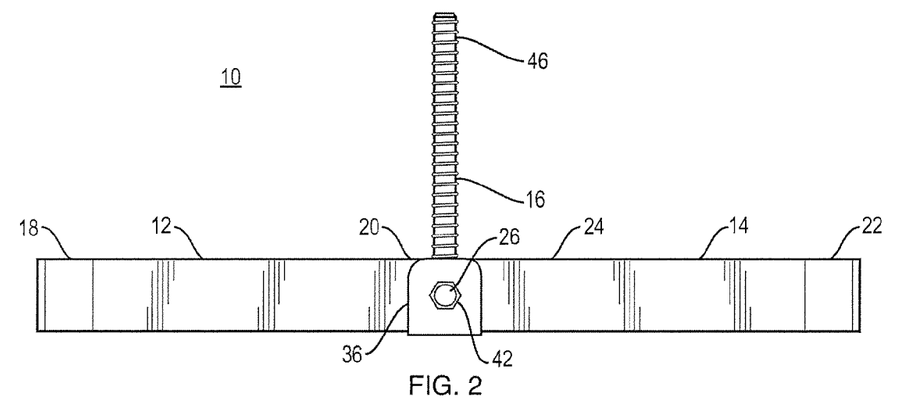
FIG. 2 is a side view of the first apparatus of the present invention in the operable position.
Figure 3:
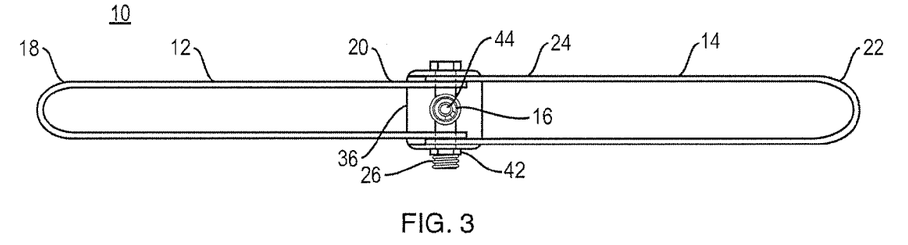
FIG. 3 is a top view of the first apparatus of the present invention in the operable position.
Figure 4:
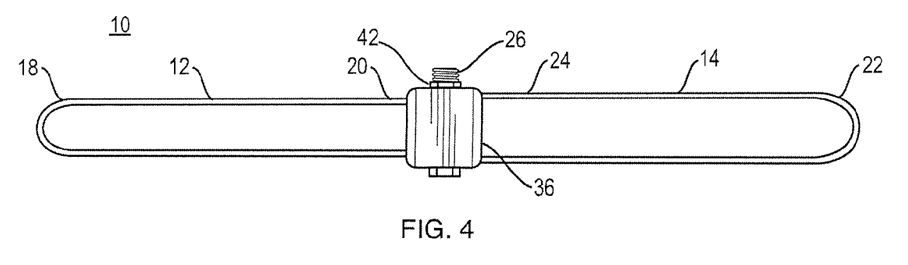
FIG. 4 is a bottom view of the first apparatus of the present invention in the operable position.
Figure 5:
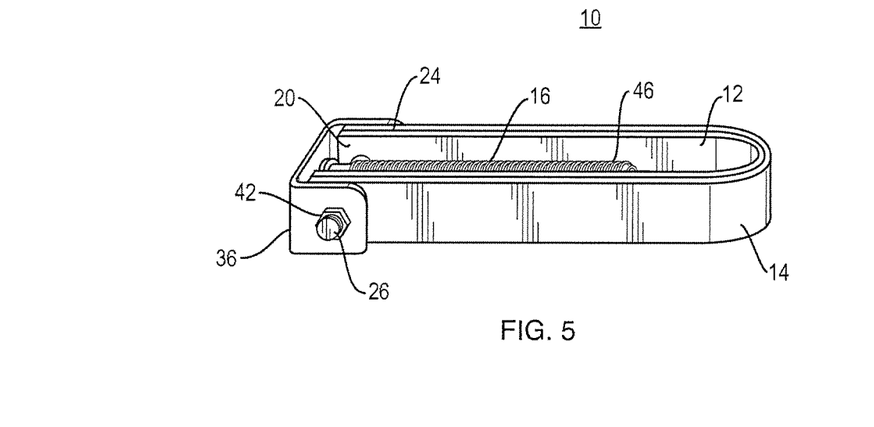
FIG. 5 is a perspective view of the first apparatus of the present invention in a collapsed position.
Figure 6:
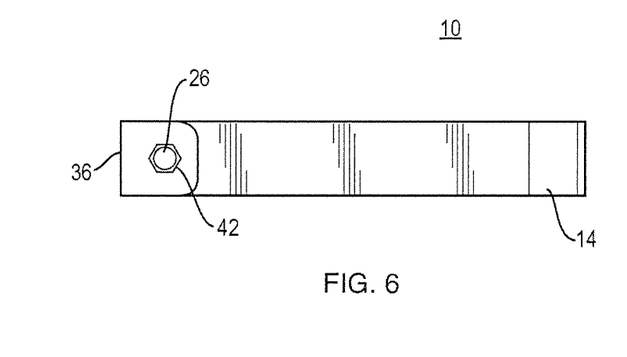
FIG. 6 is a side view of the first apparatus of the present invention in the collapsed position.
Figure 7:
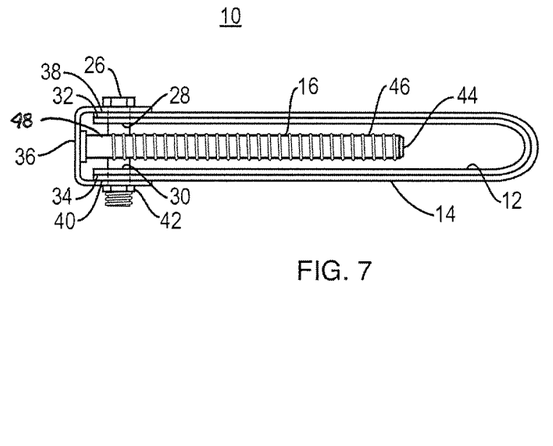
FIG. 7 is a top view of the first apparatus of the present invention in the collapsed position.

A first apparatus for removing a plug from a hole saw is a hole saw cleaner 10 shown in an operable state in FIGS. 1-4 and in a collapsed or stowable state in FIGS. 5-7. A second apparatus for removing a plug created by a hole saw or other hole cutting tool from a hole is a plug extractor 100 shown in an extended state in FIGS. 8 and 9 and in a collapsed portable state in FIGS. 10 and 11.

The cleaner 10 includes a first leg 12, a second leg 14 and a cleaning structure 16. The first leg 12 includes a first end 18 and a second end 20. The second leg 14 includes a first end 22 and a second end 24. The first leg 12 and the second leg 14 are pivotably connected together at their respective second ends 20 and 24 using a pivot pin 26 that may be a bolt 26 that is configured to pass through ports 28 and 30 of the first leg 12 and through ports 32 and 34 of the second leg 14. The cleaner 10 includes a brace 36 having ports 38 and 40 through which the pivot pin 26 also passes. The pivot pin 26 is configured to pass entirely through the first leg 12, the second leg 14 and the brace 36 and releasably retains those components together with a retainer 42 such as a nut 42.

The brace 36 is arranged to limit the extent to which the first leg 12 and the second leg 14 can pivot with respect to one another. As can be seen in FIGS. 1-4, the first leg 12 and the second leg may be pivoted on the pivot pin 26 so that they are extended away from one another. When they are substantially opposing one another to form an aligned frame base, the brace 36 prevents them from extending beyond about 180°. The result is that when the first leg 12 and the second leg 14 are fully extended as shown in FIGS. 1-4, they form a stabilizing base with the cleaning structure 16 extending upwardly therefrom at an angle of about 90° with respect to the first leg 12 and the second leg 14.

The first leg 12 and the second leg 14 as shown are formed in parabolic shapes but are not limited thereto. This shape minimizes the amount of material required to create the first leg 12 and the second leg 14 while allowing those structures to operate as stabilizing structures so that when pressure is applied to them, such as by a user placing a foot on them, they reduce the likelihood that the cleaner 10 will rotate in a way that may cause the cleaning structure 16 to point at something other than substantially a right angle with respect to an underlying surface when the cleaner 10 is in the operable position.

The dimensions of the first leg 12 are preferably less than the dimensions of the second leg 14 so that when the cleaner 10 is in a collapsed position convenient for stowage, the first leg 12 nests within the second leg 14 as shown in FIGS. 5-7. For example, in an embodiment of the cleaner 10 having the first leg 12 and the second leg 14 of parabolic shape, the first leg 12 may have a focal radius and length less than the focal radius and length of the second leg 14. It is to be understood that other configurations of the first leg 12 and the second leg 14 are permitted without deviating from the idea of forming a stabilizing base frame for the cleaning structure 16.

The cleaning structure 16 may be any form of tool configured and arranged to withstand the forces to be expected when a plug is struck in a hole saw and the hole saw is rotated and positioned to allow the cleaning structure 16 to make contact with the stuck plug. In the preferred embodiment of the invention, the cleaning structure 16 is a lag bolt of selectable threading and with an outside diameter that is less than the inside diameter of a hole saw. The cleaning structure 16 includes a pilot bit port 44 having an inside diameter selected to be greater than the outside diameter of a hole saw pilot bit and a depth selected to ensure that the pilot bit will not bottom out on the cleaning structure 16 before the cleaning structure 16 reaches the interior bottom surface of the hole saw cylinder. The cleaning structure 16 also includes a first end 46 and a second end 48. The first end 46 is the leading cutting edge of the cleaning structure 16 and is sufficiently sharpened to allow for digging into and engaging with whatever material may be plugging the hole saw. The second end 48 is fixedly or rotatably joined to the retainer 42 substantially centered on the brace 36.

The cleaner 10 may be fabricated of any material suitable to be used a plurality of times with minimal degradation. The cleaner 10 may be made of a plurality of replaceable components. Each component may be made of the same or different materials. For example, but in no way limiting, the cleaning structure 16 may be made of a metal such as stainless steel, while the first leg 12 and the second leg 14 may be made of a nonmetallic material, such as fiberglass.

In operation, the cleaner 10 is used to remove a plug stuck within the hole saw using the following steps. First, the cleaner 10, if in the collapsed configuration of FIGS. 5-7, is expanded by pivoting the first leg 12 and the second leg 14 outwardly away from one another until substantially opposing one another as shown in FIGS. 1-4 and places it on a solid surface, such as the ground, for example. Next, the user orients the pilot bit of a hole saw attached to a rotating device (such as a drill) in the pilot bit port 44 of the cleaning structure 16 and places one of his or her feet on the first leg 12 and the other of his or her feet on the second leg 16. The hole saw cylinder is further lowered onto the cleaning structure 16 such that the plug material contacts the first end 46 of the cleaning structure 16. The rotating device is then activated such that the hole saw rotates and is pressed onto the cleaning structure 16, resulting in a threading of the cleaning structure 16 onto the plug within the hole saw. That process of rotation and pressing is continued until the plug is split for easy dislodgement from the hole saw. This process using the cleaner 10 results in a fast and efficient mechanism to reduce down time and difficulty associated with the removal of material from a hole saw so that the hole saw can be used again.

The plug extractor 100 of the present invention shown in FIGS. 8-11 includes a structural tube 102 and an extendible plug engagement rod 104. The tube 102 includes a first end 106 and a second end 108. The plug engagement rod 104 includes a first end 110 and a second end 112. The first end 106 of the tube 102 includes a retainer bushing 114 and the second end 112 of the plug engagement rod 104 includes a base 116. Except at the base 116, the outer dimension of the plug engagement rod 104 is smaller than the inner dimension of the tube 102 and the inner dimension of the bushing 114. The inner dimension of the bushing 114 is smaller than the outer dimension of the base 116 of the plug engagement rod 104. This configuration allows for the sliding movement of the plug engagement rod 104 within the tube 102, but the plug engagement rod 104 cannot be removed unintentionally from the first end 106 of the tube 102 because the bushing 114 blocks the base from passing out of the first end 106 of the tube 102. As a result, the plug engagement rod 104 may be extended from within the tube 102 but remained engaged with the tube 102 at the first end 106 thereof.

The second end 108 of the tube 102 is preferably threaded or otherwise configured to removably retain thereto a cap 118. The cap 118 has corresponding threading or other similar type of joining arrangement. When the bushing 114 of the tube 102 and the base 116 of the plug engagement rod 104 are not in contact with one another and the plug engagement rod 104 is recessed into the tube 102, the cap 118 prevents the plug engagement rod 104 from passing completely out of the tube 102. The cap 118 may also include a slot or other means for releasably retaining the second end 112 of the plug engagement rod 104 to the tube 102 so that when the tube 102 is rotated, the plug engagement rod 104 also rotates. When the cap 118 is removed from the second end 108, the plug engagement rod 104 can be completely removed from within the tube 102 for maintenance, replacement or the like.

The first end 110 of the plug engagement rod 104 is the leading cutting edge of the extractor 100 and is sufficiently sharpened and of adequate structural strength to enable its insertion into whatever material may be plugging the hole. In the preferred embodiment, the first end 110 of the plug engagement rod 104 is threaded, such as a log bolt connected to a rod. The extractor 100 may also include a rod retainer 120 including a first end 122 and a second end 124. The first end 122 may be threaded or otherwise configured for removable or permanent attachment of a cap joiner 126 thereto, and the second end 124 may be threaded or otherwise configured for removable or permanent of a rod cap 128 thereto. The cap joiner 126 is configured for removable attachment to the exterior of the first end 106 of the tube 102, which is threaded or otherwise configured for joining with the cap joiner 126. The rod retainer 120 may be attached to the tube 102 when the plug engagement rod 104 is recessed within the tube 102 and the extractor 100 is not in use. The retainer 120 safely secures the plug engagement rod 104 within the tube 102 and prevents unintended damage to the first end 110 of the plug engagement rod 104 when not in use.

The extractor 100 may be fabricated of any material suitable to be used a plurality of times with minimal degradation. The extractor 100 may be made of a plurality of replaceable components. Each component may be made of the same or different materials. For example, but in no way limiting, the plug engagement rod 104 may be made of a metal such as stainless steel, while the tube 102 may be made of a nonmetallic material, such as fiberglass.

Figure 8:
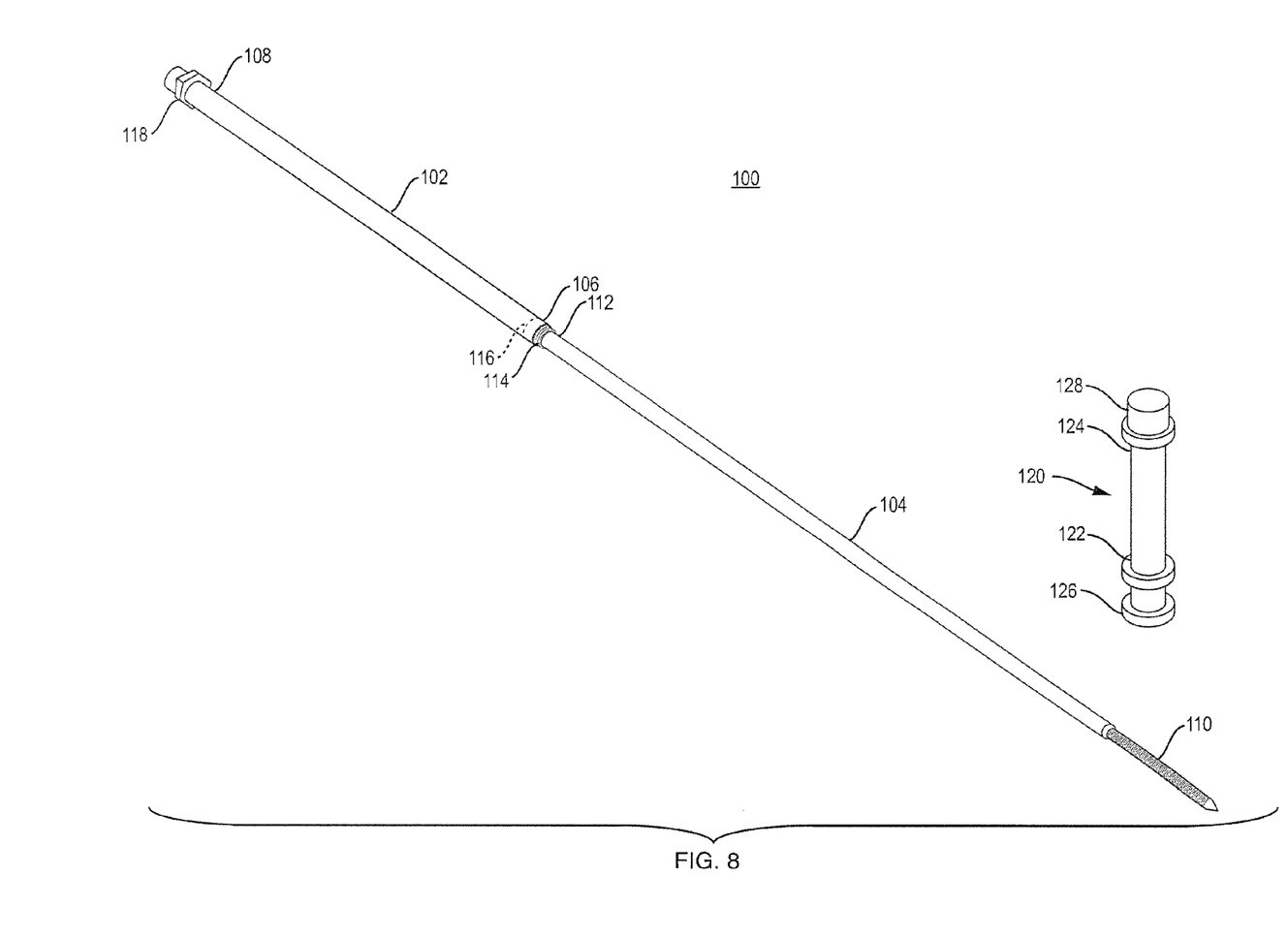
FIG. 8 is a perspective view of the second apparatus of the present invention in an extended position.
Figure 9:
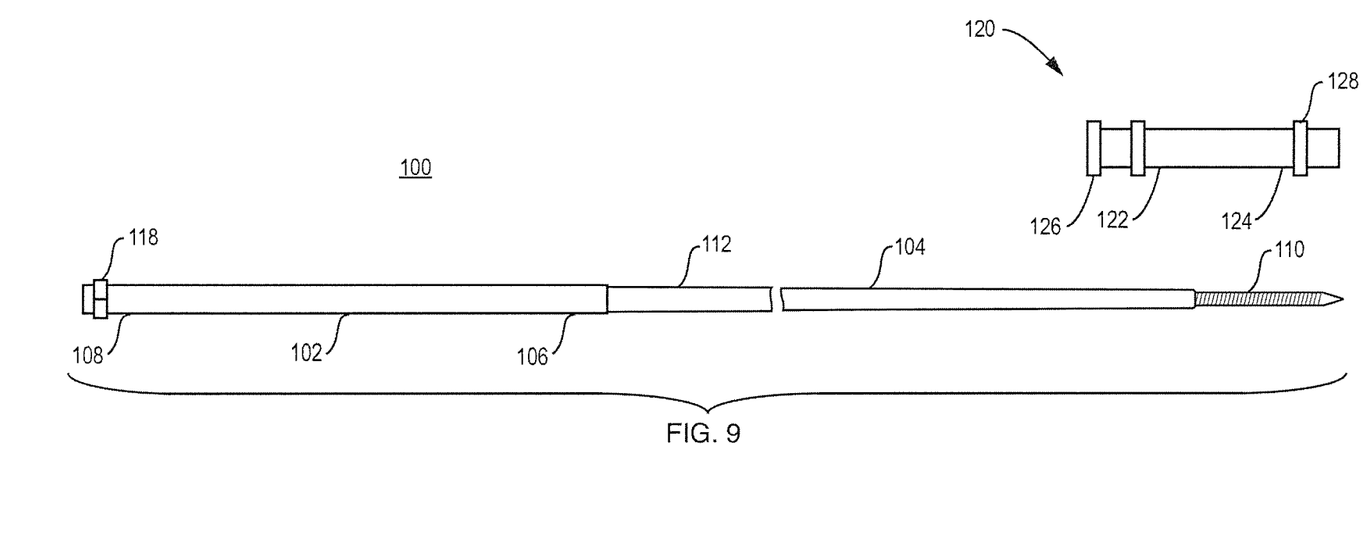
FIG. 9 is a side view of the second apparatus of the present invention in the extended position.
Figure 10:
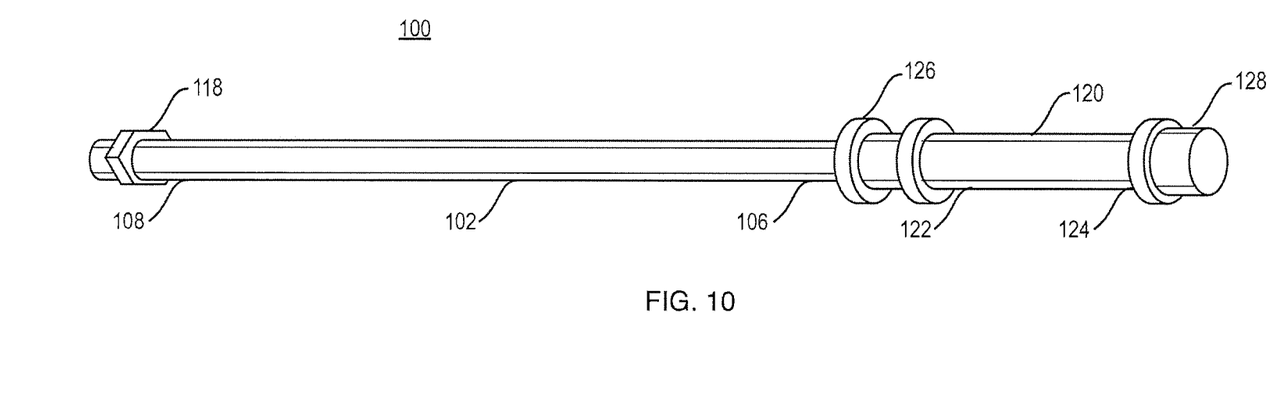
FIG. 10 is a perspective view of the second apparatus of the present invention in a collapsed position.
Figure 11:
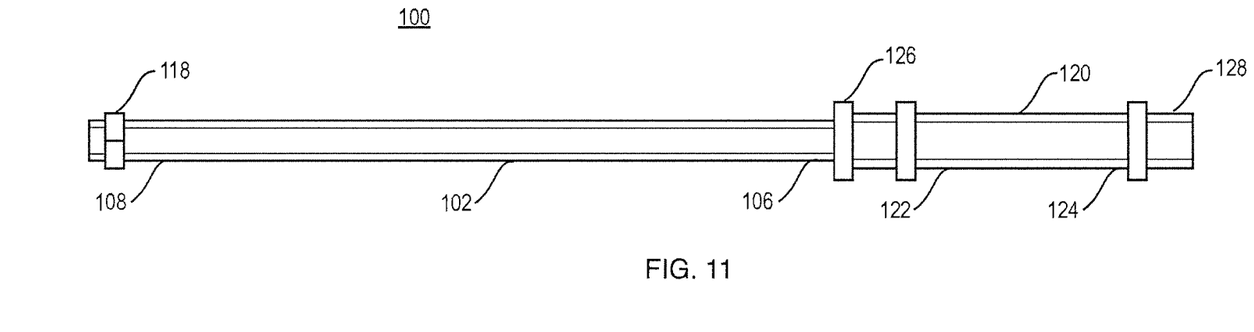
FIG. 11 is a side view of the second apparatus of the present invention in the collapsed position.

In operation, the extractor 100 is used to remove a plug stuck within a hole using the following steps. First, the first end 110 of the plug engagement rod 104 of the extractor 100 in the collapsed configuration of FIGS. 10 and 11, is placed in contact with material stuck in the hole and to be removed from the hole. The user then causes the extractor 100 to rotate, either manually or by way of a rotation-causing device connected to the extractor 100, so that the first end 110 of the plug engagement rod 104 engages with and enters into the material to be dislodged from the hole. The user continues to rotate the extractor 100 until it is believed to be sufficiently embedded in the material. That may be at least to the end of any cutting structure, such as the end of threading of the first end 110. The user then pulls the extractor 100 with sufficient effort to cause the plug engagement rod 104 to extend out from within the tube 102, as shown in FIGS. 8 and 9. When the extending causes the bushing 114 to contact the base 116, the force created results in the entire extractor 100 being pulled rapidly, and the plug material engaged with the first end 110 from the hole. This process using the extractor 100 results in a fast and efficient mechanism to reduce down time and difficulty associated with the removal of material from a hole, including holes where the plug extends a considerable distance into the hole.

An aspect of the present invention to be noted is that the cleaner 10 and the extractor 100 may be used as distinct and separate devices to clearing stuck plugs. Optionally, the cleaner 10 and the extractor 100 may be incorporated into a kit including both devices, wherein a user may employ the cleaner 10 for hole saw plug removal and the extractor 100 for hole plug removal.

It is to be understood that various modifications may be made to the cleaner 10 and the extractor 100 described herein without departing from the spirit and scope of the invention. Accordingly, other embodiments are within the scope of the claims appended hereto.

What is claimed is:

1. An apparatus for removing a plug from a hole saw, the apparatus comprising:
   a. a first leg having a first end and a second end;
   b. a second leg having a first end and a second end;
   c. a retainer for pivotally connecting the second end of the first leg and the second end of the second leg together; and
   d. a cleaning structure coupled to the retainer, wherein the cleaning structure includes a pilot bit port for receiving a pilot bit of the hole saw therein,
   wherein the first leg and the second leg may be pivoted away from one another to form a base frame and the cleaning structure extends outwardly from the base frame formed by the first leg and the second leg and wherein dimensions of the first leg are smaller than dimensions of the second leg so that the first leg nests within the second leg when the first leg and the second leg are positioned adjacent to one another.

2. The apparatus of claim 1 wherein the first leg and the second leg are of parabolic shape.

3. The apparatus of claim 1 wherein the retainer is a bolt.

4. The apparatus of claim 1 wherein the cleaning structure is a screw having an outer dimension that is less than an inner dimension of the hole saw.

5. An apparatus for removing a plug from a hole saw, the apparatus comprising:
   a. a first leg having a first end and a second end;
   b. a second leg having a first end and a second end;
   c. a retainer for pivotally connecting the second end of the first leg and the second end of the second leg together;
   d. a cleaning structure coupled to the retainer, wherein the cleaning structure includes a pilot bit port for receiving a pilot bit of the hole saw therein; and
   e. a brace coupled to the retainer, wherein the brace is configured to restrict the pivotal movement of the first leg and the second leg,
   wherein the first leg and the second leg may be pivoted away from one another to form a base frame and the cleaning structure extends outwardly from the base frame formed by the first leg and the second leg.

6. The apparatus of claim 5 wherein the retainer is a bolt.

* * * * *